United States Patent
O'Keefe

(10) Patent No.: US 10,610,750 B2
(45) Date of Patent: Apr. 7, 2020

(54) GOLF BAG ROLLERS AND ACCESSORIES

(71) Applicant: Eamonn O'Keefe, Crewe (GB)

(72) Inventor: Eamonn O'Keefe, Crewe (GB)

(*) Notice: Subject to any disclaimer, the term of this patent is extended or adjusted under 35 U.S.C. 154(b) by 0 days.

(21) Appl. No.: 15/753,966

(22) PCT Filed: Aug. 17, 2016

(86) PCT No.: PCT/GB2016/052547
§ 371 (c)(1),
(2) Date: Feb. 20, 2018

(87) PCT Pub. No.: WO2017/029500
PCT Pub. Date: Feb. 23, 2017

(65) Prior Publication Data
US 2018/0243624 A1 Aug. 30, 2018

(30) Foreign Application Priority Data

Aug. 17, 2016 (GB) .................................. 1514606.1

(51) Int. Cl.
*A63B 55/30* (2015.01)
*A63B 55/60* (2015.01)
*B62B 5/00* (2006.01)

(52) U.S. Cl.
CPC .............. *A63B 55/30* (2015.10); *A63B 55/60* (2015.10); *A63B 2210/50* (2013.01); *B62B 5/0093* (2013.01); *B62B 2202/404* (2013.01); *B62B 2301/254* (2013.01)

(58) Field of Classification Search
CPC ..... A63B 55/30; A63B 55/60; A63B 2210/50; B62B 5/0093

USPC .................................. 280/DIG. 6; 206/315.3
See application file for complete search history.

(56) References Cited

U.S. PATENT DOCUMENTS

| | | | |
|---|---|---|---|
| 646,869 A | 4/1900 | Perkes | |
| 2,320,373 A * | 6/1943 | Meyer | B67C 3/244 137/613 |
| 2,590,154 A * | 3/1952 | Burns | B62B 1/262 206/315.2 |

(Continued)

FOREIGN PATENT DOCUMENTS

GB  2523995 A  9/2015

OTHER PUBLICATIONS

International Search Report and Written Opinion dated Dec. 6, 2016.

(Continued)

*Primary Examiner* — Sue A Weaver
(74) *Attorney, Agent, or Firm* — Fresh IP, PLC; Cliff Hyra; Aubrey Chen

(57) ABSTRACT

A golf bag (100) comprises a rotatable roller (116) upon which the bag (100) can be supported while being moved. The roller (116) is axially elongate and has outer portions (120) whose axial section has a convex curvature to reduce damage to ground over which the bag (100) is moved. Also disclosed is a golf bag accessory (200) comprising mounting means (206) for receipt of a portion of a golf bag (202). The golf bag accessory (200) further comprises securing means (204) for securing the golf bag (202) in the mounting means (206) and a rotatable roller (116) which is axially elongate and comprises an outer surface whose axial section (120) has a convex curvature.

15 Claims, 8 Drawing Sheets

(56) References Cited

U.S. PATENT DOCUMENTS

| | | | | |
|---|---|---|---|---|
| 3,809,231 | A | * | 5/1974 | Palma .................... G10G 7/005 |
| | | | | 190/18 A |
| 4,012,051 | A | | 3/1977 | Embinder |
| 4,383,563 | A | * | 5/1983 | Kirchhoff, Jr. ........ A63B 55/00 |
| | | | | 206/315.2 |
| D292,873 | S | * | 11/1987 | Chen ................................ 16/30 |
| 6,513,816 | B1 | * | 2/2003 | Kijima .................. B62B 5/0083 |
| | | | | 280/47.26 |
| 2002/0033583 | A1 | | 3/2002 | Engelhardt et al. |
| 2003/0030240 | A1 | * | 2/2003 | Wang .................... B62B 5/0083 |
| | | | | 280/47.315 |
| 2006/0202548 | A1 | | 9/2006 | Chen |
| 2007/0252353 | A1 | | 11/2007 | Sokol et al. |
| 2012/0261223 | A1 | | 10/2012 | Pattni |
| 2014/0028004 | A1 | * | 1/2014 | McCarthy .............. A63B 55/00 |
| | | | | 280/651 |
| 2017/0319921 | A1 | * | 11/2017 | Hecht .................... A63B 55/30 |

OTHER PUBLICATIONS

International Search Report dated Nov. 24, 2016 for PCT application No. PCT/GB2016/052547 filed on Aug. 17, 2016.
Search Report dated Jan. 5, 2016 for GB1514606.1 filed on Aug. 17, 2015.

* cited by examiner

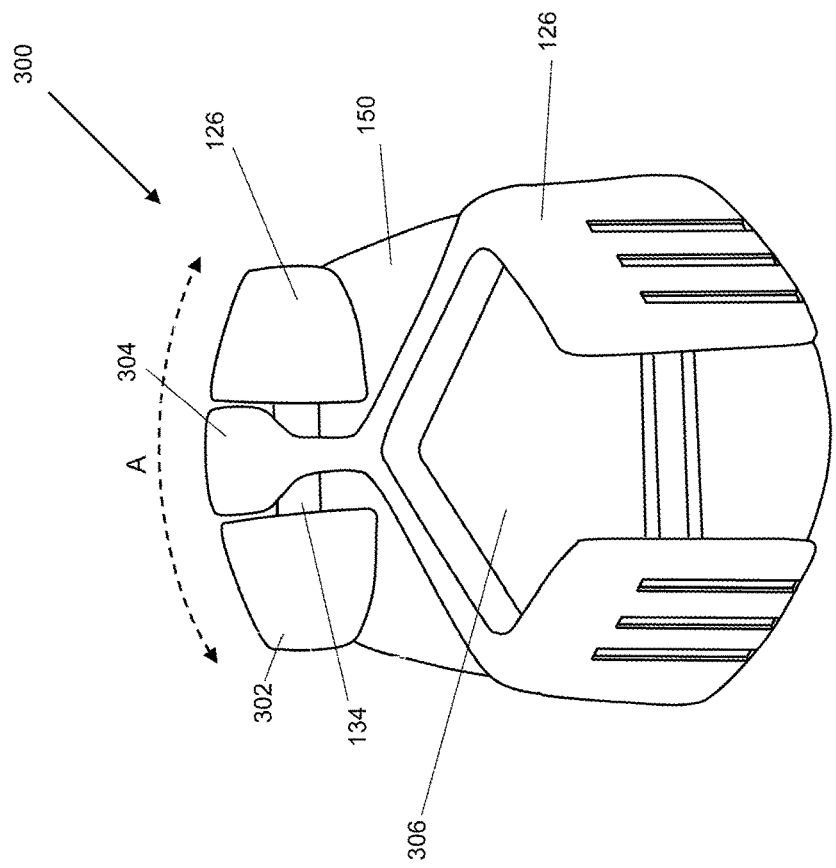
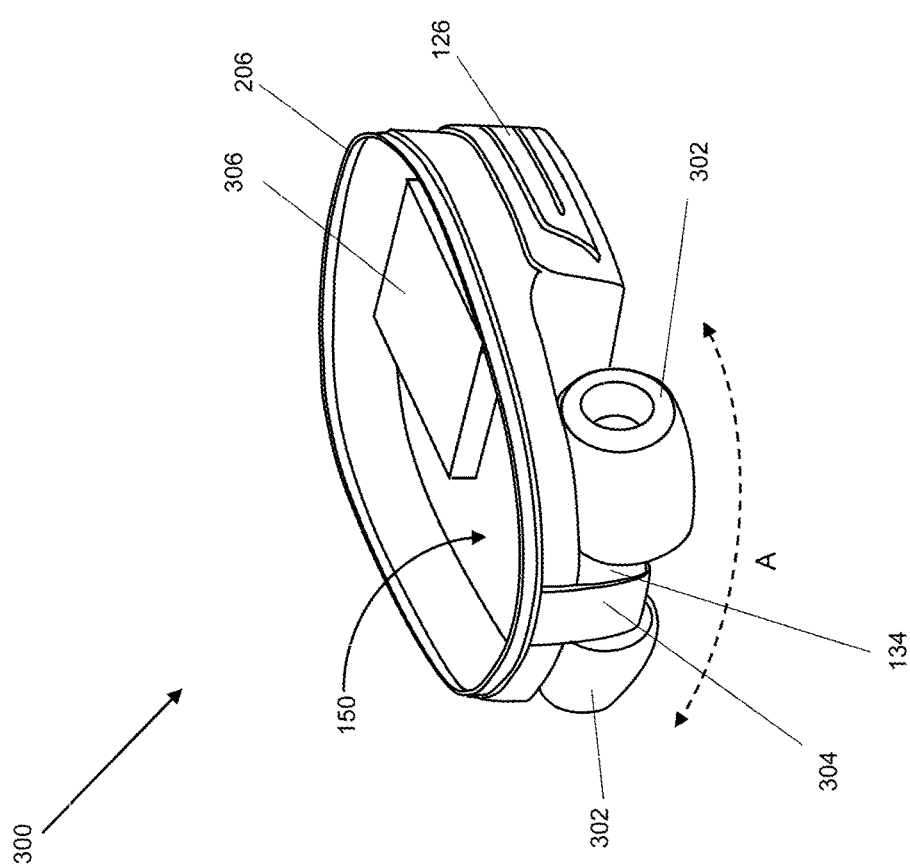

GOLF BAG ROLLERS AND ACCESSORIES

This application claims the benefit of Great Britain patent application No. 1514606.1, filed Aug. 17, 2015, which is hereby incorporated by reference in its entirety.

FIELD OF THE DISCLOSURE

The present disclosure is concerned with golf bags and particularly with golf bags which can be rolled across the ground.

BACKGROUND

Golf bags for containing clubs, balls and other equipment required on the golf course are very commonly mounted on wheeled trolleys so that the player or caddy need not support the weight of bag and contents while moving from place to place. Such trolleys typically have a framework for supporting the bag itself and a wide set pair of wheels journalled upon the framework. While effective, such bag/trolley combinations are typically cumbersome to transport from one course to another.

It is known to fit the bag itself with wheels, as disclosed for example in U.S. Pat. No. 5,435,581 (Rosenfield). The wheels may be coupled to an internal framework of the bag. Again such arrangements typically have a wide set pair of wheels and in some cases even have an elaborate telescopic or folding framework to allow a wide structure supporting the wheels to be reduced in bulk—e.g. by being withdrawn into compartments of the bag—when not in use. U.S. Pat. No. 5,470,095 (Bridges) teaches a bag which operates in this way.

Golf bags fitted directly with wheels have not gained wide acceptance and it is believed a major reason for this is that the wheels utilised, which of necessity are typically somewhat smaller than the wheels of golf trolleys, cause too much damage to the ground of the golf course.

A golf bag fitted with a broad roller is disclosed in GB 2299557 (Costello) but this roller has a cylindrical body of constant diameter save for two seemingly ridged portions which meet the roller's end faces in abrupt corners. It is believed that these features would cause damage to the turf of a golf course, particularly as wheeling the bag through a corner or turning it on the spot necessarily involves the two ridged portions moving over the turf at different rates so that one or both of these portions apparently designed for high traction, must slip. In addition, due to the method of connecting the roller to the bag, it is believed that the roller will be unstable and liable to dislodge itself from the bag over rough ground.

SUMMARY

In accordance with a first aspect of the present invention there is a golf bag comprising a rotatable roller upon which the bag can be supported while being moved, the roller being axially elongate and having outer portions whose axial section has a convex curvature to reduce damage to ground over which the bag is moved.

In accordance with a second aspect of the present invention there is a golf bag accessory comprising a mounting means for receipt of a portion of a golf bag a securing means for securing the golf bag in the mounting means and a rotatable roller which is axially elongate and comprises an outer surface whose axial section has a convex curvature.

The arrangement allows several drawbacks of the above described golf bags to be overcome. The roller can provide adequate area of contact with the ground—e.g. the turf of a golf course—to reduce damage thereto as compared with the known wheeled bags. The curved outer portions of the roller not only facilitate turning of the bag, as it is wheeled around a corner or even turned on the spot, but also ensure that if the bag is tipped laterally its weight is still supported across a large enough area, without abrupt corners or transitions, to reduce damage to the turf.

The roller can form part of a compact structure. Preferably the length, in the bag's lateral direction, of the roller and an associated mounting is not substantially greater than the bag's maximum lateral dimension. As compared with known wheeled golf bags, in which the wide set wheels lie outboard of the bag body, the bag according to the present invention can thus be more easily portable. The roller is preferably fitted beneath a receptacle portion of the bag, which again minimises bulk.

Fitting of the roller to the bag can be achieved in a constructionally straightforward manner. The roller's mounting is preferably non-releasably coupled to the bag. It may be an integral part of the bag. The roller may also be non-releasably coupled to the bag. Preferably the roller is journalled between a pair of support members or portions. These may be formed as part of a substantially "n" sectioned support (i.e. a support having a central, gently curved portion and two, preferably identical, lateral portions extending downwardly—preferably parallel to each other—from either end of the central portion).

The roller's mounting is preferably coupled to a stiffening structure of a receptacle portion of the bag. For example the mounting may be coupled through a lug or bracket to the bag's spine. It is preferred that the mounting allows the roller to be detached. This can facilitate maintenance or even transportation of the bag.

The support members or portions may be formed as integral parts of a skirt depending from a lower portion of the bag.

It is especially preferred that the roller's mounting be resiliently flexible, such as to cushion movement of the bag over rough ground. To this end the mounting may comprise resilient material. This may be rubber or the like.

In an especially preferred embodiment of the present invention the roller is barrel shaped. This shape is considered particularly beneficial in reducing ground damage and enabling turning of the bag.

In a further preferred embodiment the roller's diameter is reduced in a central portion. This reduction in diameter may be such as to form a concave curve in the central region leading smoothly to outer portions of larger diameter. This shape is considered beneficial in terms of stability, particularly on uneven ground.

In still a further preferred embodiment the roller comprises a pair of roller parts independently rotatable about a common axis. Together these may form any of the roller shapes referred to with reference to other preferred features of the present invention. Since the two roller parts can rotate at different rates as the bag is turned, turf damage is again reduced.

In accordance with a further aspect of the invention there is a golf bag fitted with a rotatable roller upon which the bag can be supported while being moved, the roller having a diameter which reduces toward its ends.

BRIEF DESCRIPTION OF THE DRAWINGS

Specific embodiments of the present invention will now be described, by way of example only, with reference to the accompanying drawings in which:—

FIG. 7a illustrates a second retro-fit golf bag attachment embodying the present invention viewed from the side;

FIG. 7b illustrates the retro-fit attachment of FIG. 7a viewed from underneath;

DETAILED DESCRIPTION

Figure 1A:
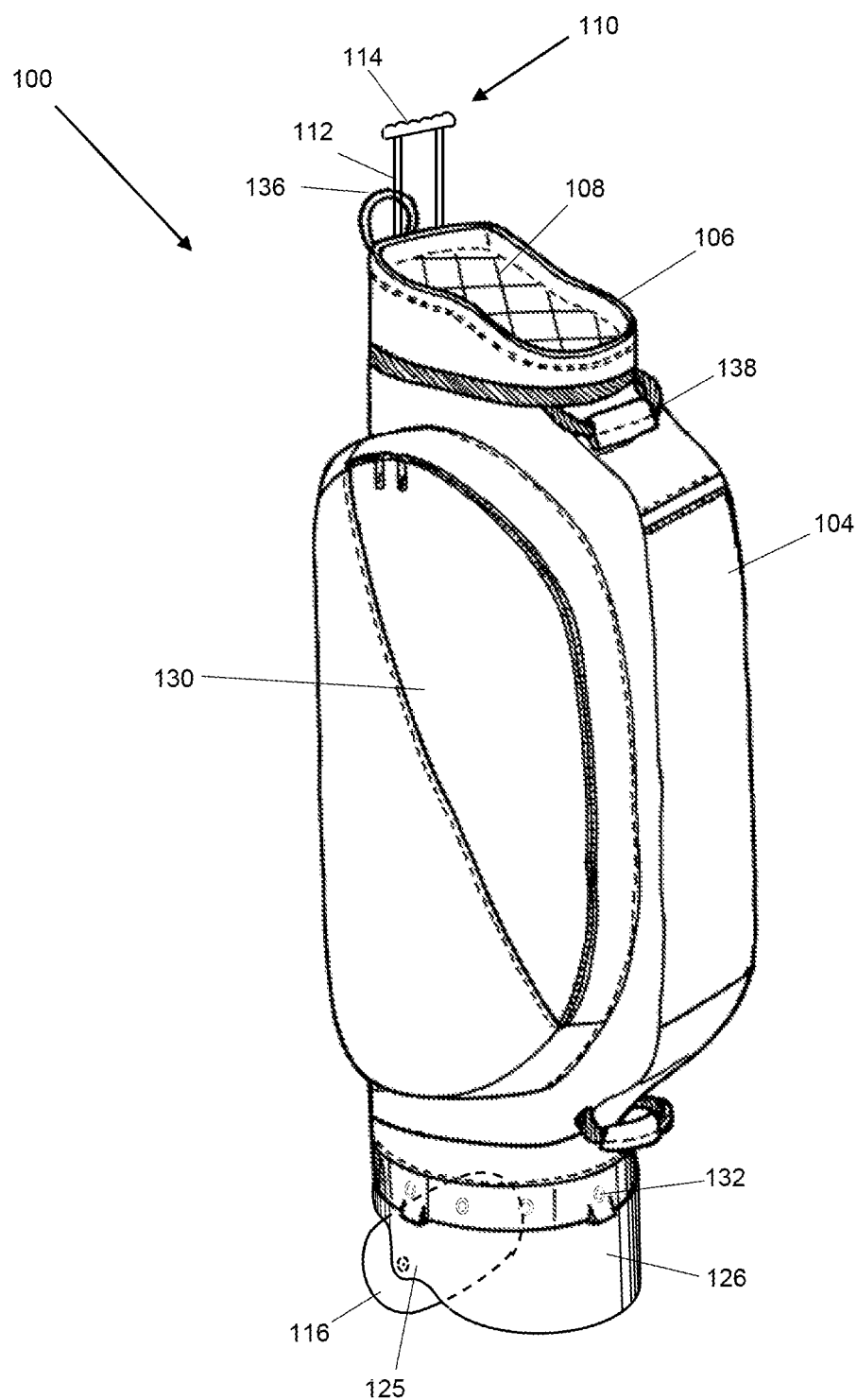
FIG. 1a is a perspective illustration of a first golf bag embodying the present invention viewed from the side.
Figure 2:
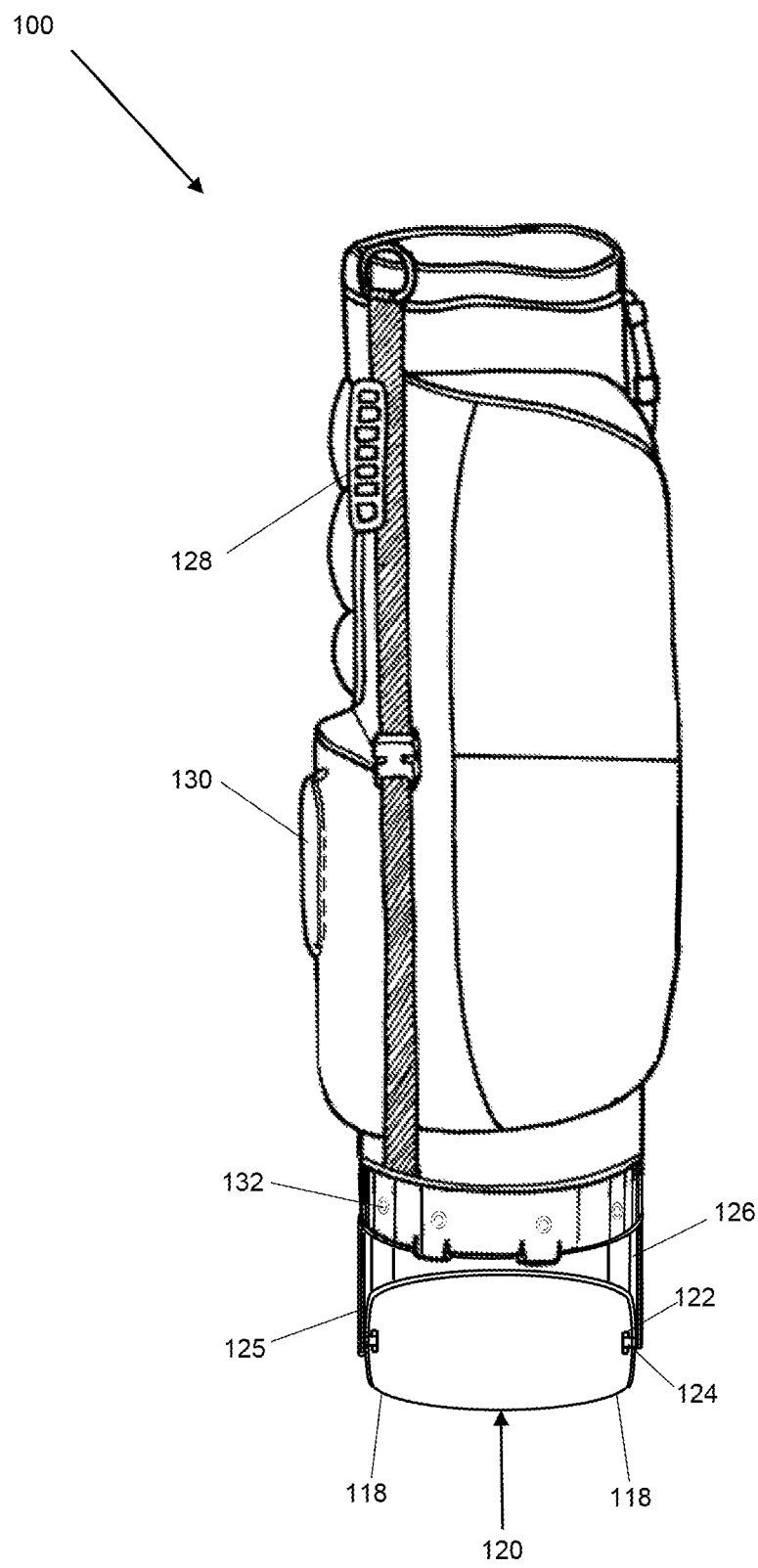
FIG. 2 illustrates the golf bag of FIG. 1a viewed from the back, a roller and associated parts of the bag being seen in section.

The golf bag 100 illustrated in FIGS. 1a and 2 has a flexible skin 104 forming an elongate receptacle which is open at mouth 106 for receiving golf clubs and other items. The receptacle is stiffened along its length by an internal structure part of which is seen at 108. Protruding upwardly from the bag is a handle 110 formed by a pole 112 with at its upper end a grip 114. The handle may be fixed but in the illustrated embodiment is telescopically retractable. An alternative would be to arrange for the pole to fold against the remainder of the bag when not in use.

In a further alternative, the aforementioned handle protruding upwardly from the bag is omitted. At the bag's lower end is a rotatable roller 116. The rotatable roller 116 is seen in axial section in FIG. 2. The roller's diameter varies along its length in a manner which reduces damage to the turf or other type of ground across which the bag is drawn. In particular end portions 118 of the rotatable roller, viewed in axial section as in FIG. 2, are seen to have convex curvature. These portions are in the present embodiment radiussed. Consequently even when, due to tipping of the bag, weight is borne mainly upon one or other of the end portions 118, the weight is spread across quite a large area of contact with supporting turf, this area of the roller being without abrupt corners which could cause excessive turf damage.

The rotatable roller 116 is barrel shaped. Its diameter reduces gradually on either side of a central region. This gradual diameter reduction takes the form of a gentle curve as seen at 120. The shape of the rotatable roller 116 facilitates turning of the golf bag 100 while reducing damage to the supporting turf as compared, for example with a simple constant diameter roller. Since the turf yields somewhat, the golf bag's weight is spread across a wide portion of the roller despite its gentle curvature 120. However contact pressure typically diminishes toward the roller's ends due to the curvature so that these portions can slide relatively easily over the supporting turf, as they must do when the bag is turned around a corner or even rotated on the spot.

The rotatable roller 116 is journalled upon a pair of stub shafts 122 protruding in the illustrated embodiment into bearings 124 received in recesses in the roller's end faces. While plain bearings could be used for economy, roller bearings, and specifically ball bearings, are used in the illustrated embodiment for the sake of smooth running and low friction. The stub shafts 122 are, in the illustrated embodiment, integrally formed with sides 125 of the bag. The sides 125 form part of a skirt 126 depending from the lower rear end of the receptacle portion of the bag. As can be seen in FIG. 2 this construction effectively provides an "n" shaped mounting for the rotatable roller 116.

In the illustrated example, golf bag 100 is provided with a strap 128 by means of which it can be lifted and carried. It also has exterior pockets 130. In a further embodiment illustrated in FIG. 1b, the rotatable roller 116 is borne on an axis positioned in front of the centre of gravity of the bag in a manner that facilitates tilting of the bag forward. Like numerals designate like parts illustrated in FIG. 1a as the context requires.

In the similar manner as that described above with reference to FIG. 1a, a golf bag 140 is provided with a rotatable roller 116 at its lower end. The roller's diameter varies along its length in a manner which reduces damage to the turf or other type of ground across which the bag is drawn. The rotatable roller is journalled upon stub shafts (not shown) formed integrally with sides 125 of the bag. The sides 125 form part of a skirt portion depending from the lower front end of the receptacle portion of the bag. In the illustrated example, golf bag 140 is provided with straps 136 and 138 by means of which a user can tilt and move the bag forward. In an alternative example not shown, golf bag 100 is provided with a grab handle positioned on the upper front portion of the bag to facilitate tilting and moving of the bag forward.

Figure 3:
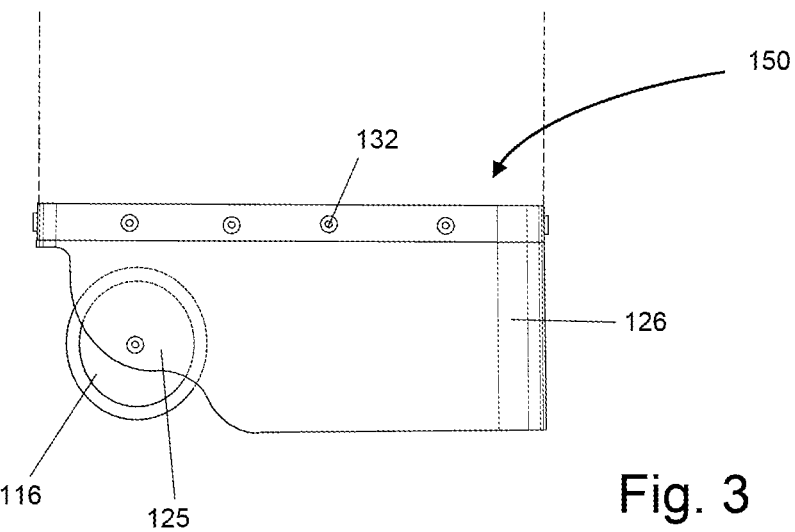
FIG. 3 illustrates the lower part of the golf bag of FIG. 1a viewed from the side.
Figure 4:
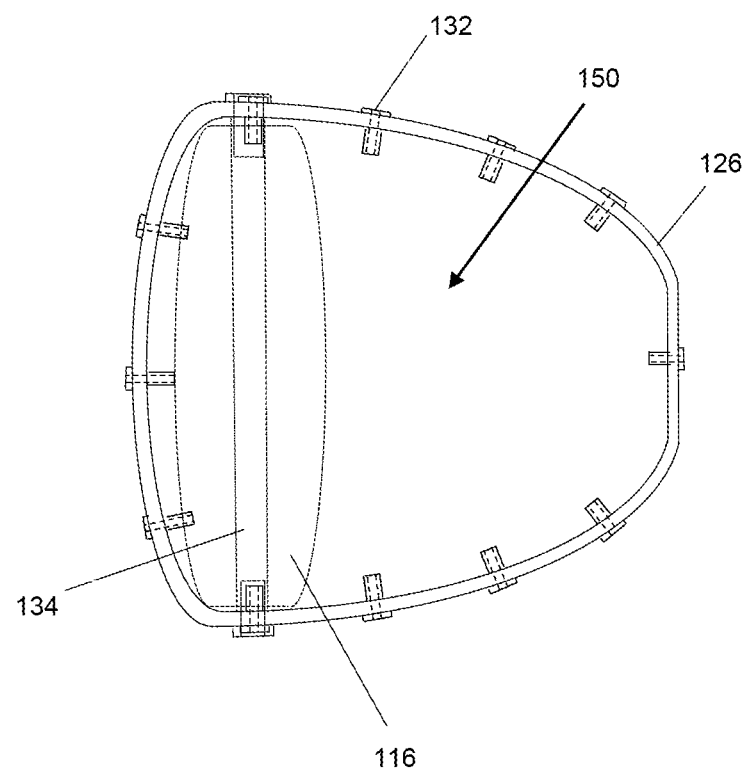
FIG. 4 illustrates a top view of the golf bag of FIG. 3.

As illustrated in FIGS. 3 and 4, the base member 150 of the golf bag is preferably trapezoidal in shape and is secured to the internal structure of the golf bag by fastening elements 132 which can be seen in greater detail in FIG. 4. In the illustrated embodiment, the fastening elements are rivets 132. However, as will be apparent, the base member 150 may be secured to the internal structure of the golf bag by other securement means such as screw or a clamping mechanism.

Figure 1B:
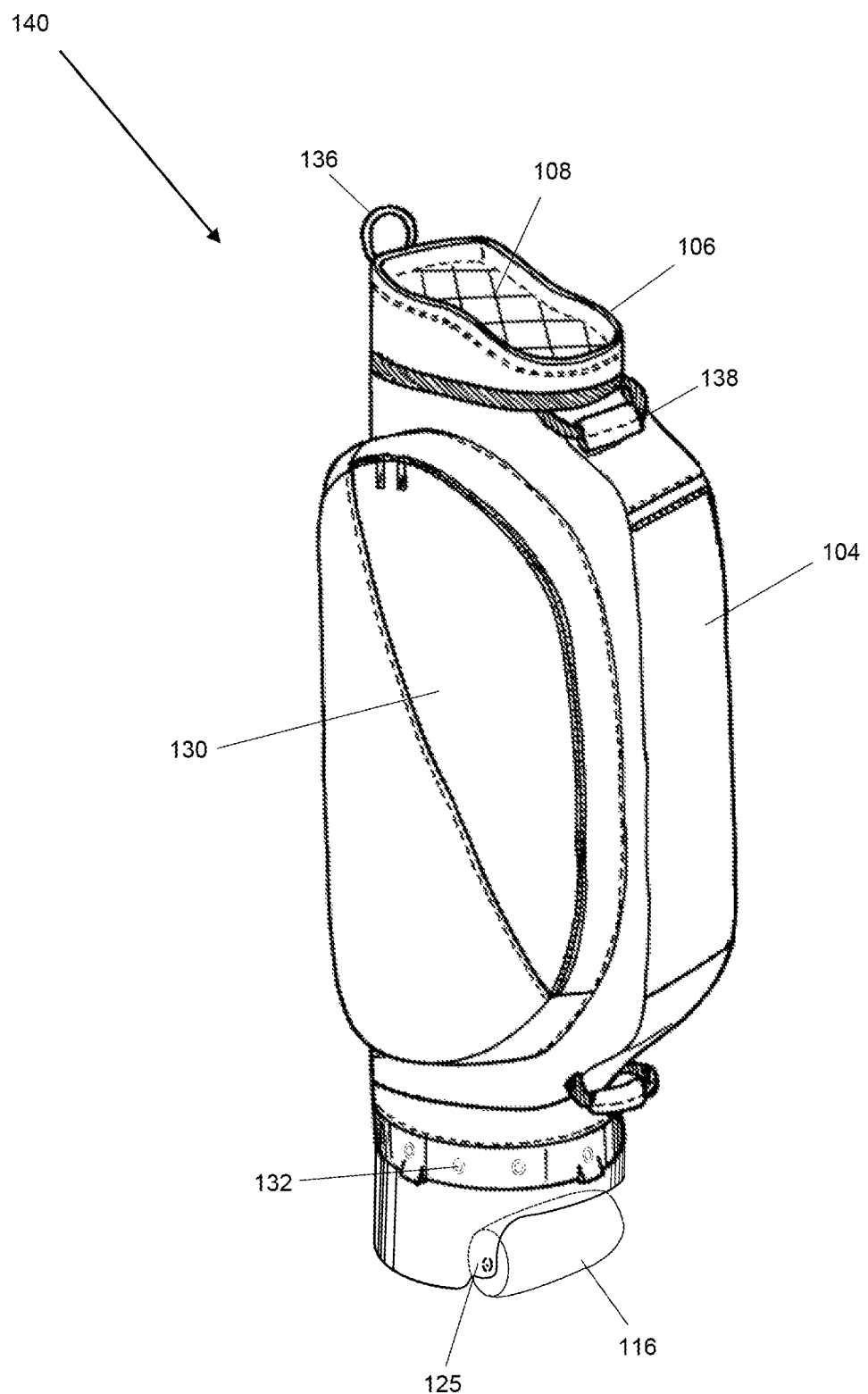
FIG. 1b is a perspective illustration of a second golf bag embodying the present invention viewed from the side.

As can be seen in FIG. 4, the rotatable roller is borne on an axle 134 mounted such that the rotatable roller 116 does not cross the centre of the base member 150 to facilitate tilting of the golf bag during transport. In the illustrated example the axle 134 is mounted in a manner that facilitates tilting of the bag backward. However, as will be apparent, the axle 134 may be positioned to facilitate tilting of the bag forward as illustrated in FIG. 1b.

Figure 5:
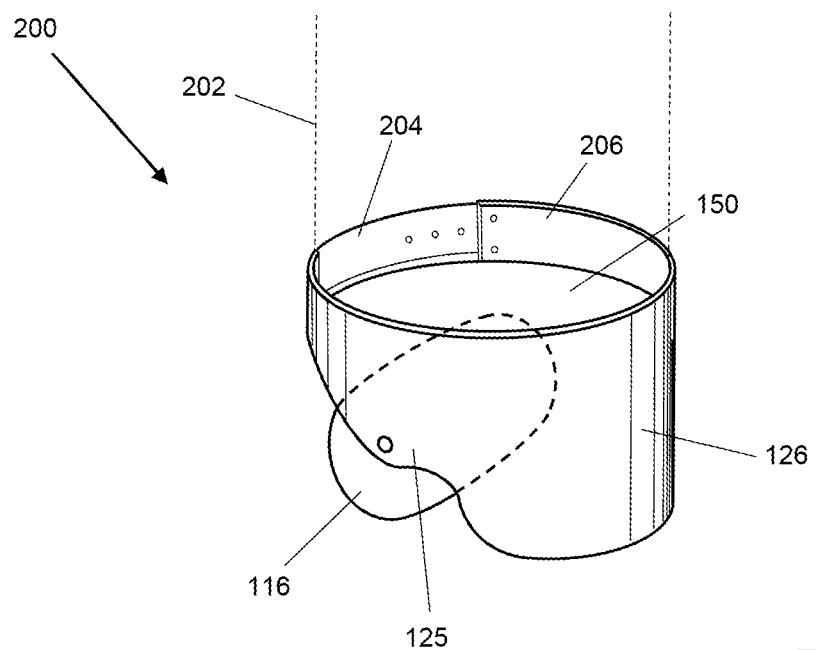
FIG. 5 illustrates a retro-fit golf bag attachment viewed from the side in accordance with an embodiment of the invention.
Figure 6:
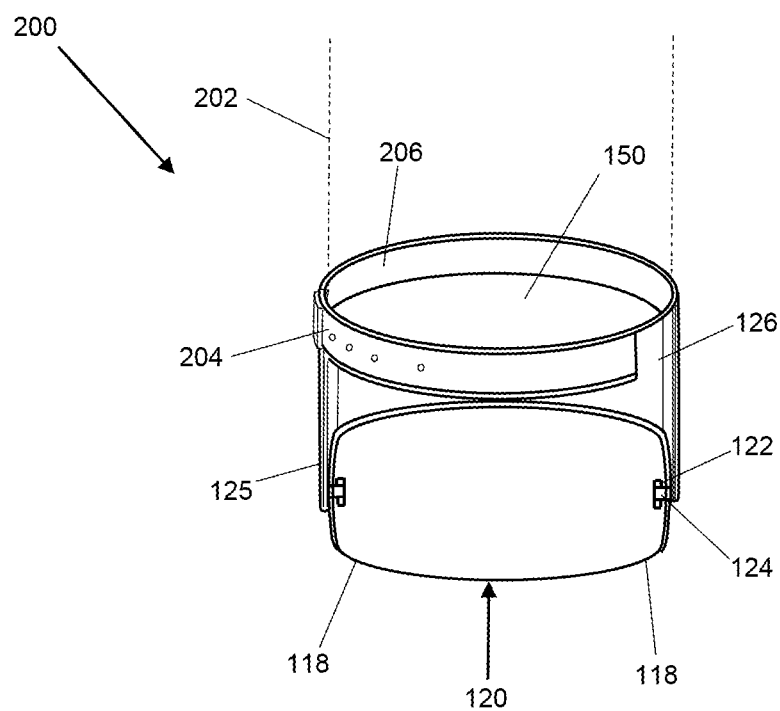
FIG. 6 illustrates the retro-fit attachment of FIG. 5 viewed from the back.

In a further embodiment illustrated in FIGS. 5 and 6, the rotatable roller forms part of a retro-fit accessory 200 for attachment to an existing golf bag 202 by way of an adjustable buckle strap 204. Like numerals designate like parts illustrated in FIGS. 1a to 4 as the context requires. FIG. 5 is a side view of the retro-fit accessory 200. The retro-fit accessory comprises a generally planar base wall 150 for abutment with the base of a golf bag and an enclosing wall 206 extending perpendicularly from the periphery of the base wall, which together define a recess for receipt of the base of a golf bag. The accessory further comprises an adjustable buckle strap 204 extending around the enclosing wall 206 and a skirt portion 126 extending downwardly from the periphery of the base wall 150 and merging smoothly within the enclosing wall 206. The skirt portion 126 extends perpendicularly from the periphery of the base wall 150 to provide an "n" shaped mounting for a rotatable roller 116 in a similar manner to the embodiment illustrated in FIGS. 1-4, and is cut away or rebated in the vicinity of the roller 116. In addition to supporting the axle bearing the rotatable roller 116, the skirt portion 126 provides vertical stability to an existing golf bag 202 fitted to the apparatus when the bag is in an upright position.

The adjustable buckle strap 204 extends around the enclosing wall and therefore also around the base portion of an existing golf bag 202 when fitted into the accessory 200. The adjustment strap is adjustable in length to accommodate different sizes of golf bags 202. In the illustrated embodiment, the retro-fit accessory 200 is releasably secured to the base of an existing golf bag by means of a buckle strap. However, as will be apparent to the skilled person, other fastening means may be employed including hook and loop fasteners, snap fasteners etc.

In addition, the receiving portion 206 of the skirt 126 of the retro-fit attachment 200 could be of flexible material or material hinged at one or more places along its length to assist accommodating different sizes of golf bag.

When not in use, the retro-fit accessory 200 may be removed from the golf bag 202. It occupies a relatively small amount of space, is lightweight and can be easily transported. No modification to an existing golf bag 202 is required when using the retro-fit accessory 200.

The retro-fit accessory illustrated in FIGS. 7a and 7b is very similar in construction to the embodiment of FIGS. 5 and 6, and the same reference numerals have been used to designate like features. The main differences from the embodiment of FIGS. 5 and 6 are the mounting of, and number of, rollers.

As can be seen in FIG. 7a, two identical rollers 302 are mounted one on either end of an axle 134 suspended from a support 304 which extends downwardly from the front of the enclosing wall 206. The rollers 302 are shaped in such a way that when mounted on axle 134, they form an interrupted barrel shape (i.e. interrupted by the support 304), indicated by the dashed line A, similar to that seen in FIG. 2, each roller having a bellied inner portion of relatively gentle curvature leading to a radiussed end portion. In the illustrated example, rollers 302 may rotate at different rates, thereby reducing damage to supporting turf when bag is wheeled through a corner or when turned on the spot. As best seen in FIG. 7b, a recess 306 is formed in the bottom of the base member 150 (which projects into the recess for receipt of the golf bag) in order to accommodate a projection formed on a support structure of a golf buggy (not shown). In the illustrated example, a square recess 306 is formed in the base member 150. However, as will be apparent, the recess 306 may form a plurality of different shapes to accommodate a plurality of different shaped projections.

Figure 8:
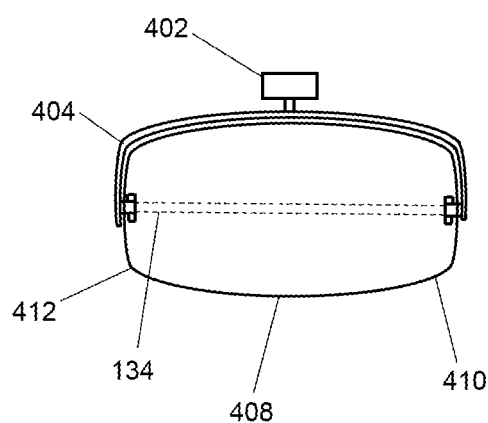
FIGS. 8, 9, 10 and 11 illustrate respective rollers and mountings used in further bags embodying the present invention viewed from the front.
Figure 9:
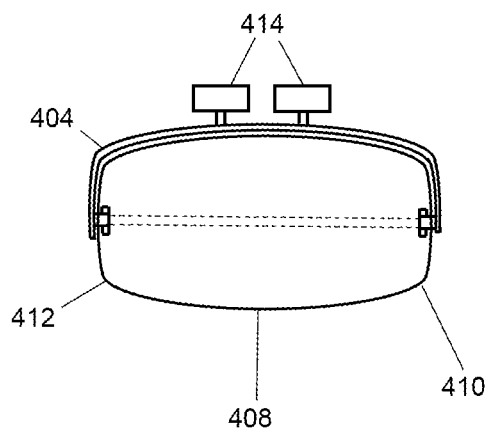
Figure 10:
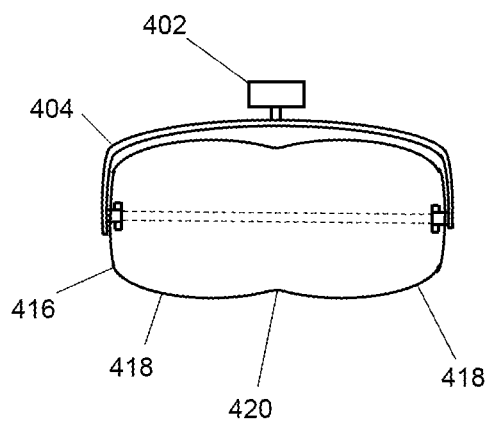
Figure 11:
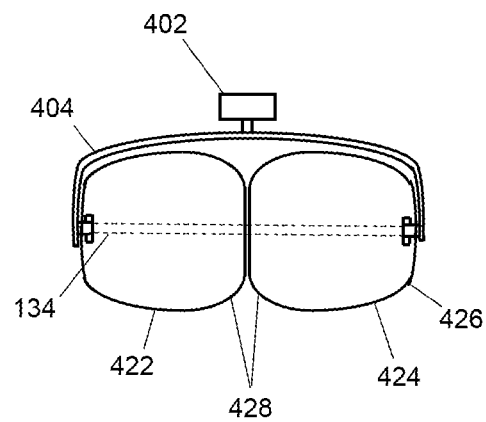

In this way, the retro-fit accessory 300 allows a golf bag 202 to be securely retained on the support structure of a golf buggy. The embodiments illustrated in FIGS. 8 to 11 have a different mounting for the roller from that illustrated in FIGS. 1a to 7b. In each case the mounting comprises an "n" shaped support 404 between the lower ends of an axle 134 bearing the roller 116. In FIGS. 8, 10 and 11 a single lug or bracket 402 projects upward from the support 404 and is coupled to the bag's spine to securely locate the whole assembly relative to the remainder of the golf bag 202. In FIG. 9 this coupling is through a pair of lugs or brackets 414 each projecting upward from the support 404.

In the FIGS. 8 to 11 embodiments the roller mounting is resiliently flexible in order to cushion the bag's travel over uneven ground. To this end the support 404 and/or the lugs/brackets 402, 414 are formed of rubber or other similar flexible material. Alternatively one or both of these components may be of metal and be dimensioned to provide the necessary degree of resilient flexibility.

FIGS. 8 to 11 illustrate different possible formations of the roller. In FIGS. 8 and 9 the roller is labelled 408 and has in both cases a barrel shape similar to that seen in FIG. 2, with a bellied central portion 408 of relatively gentle curvature leading to radiussed end portions 410 and 412.

FIG. 10 illustrates an alternative roller shape which again has radiussed end portions, labelled 416 in this drawing, but whose diameter is reduced at the centre. This reduction in diameter forms a gentle concave curve 420 along the roller's centre portion and two large diameter outer portions 418. This roller 410 has improved stability as compared with the barrel shaped rollers described above.

Figure 12:
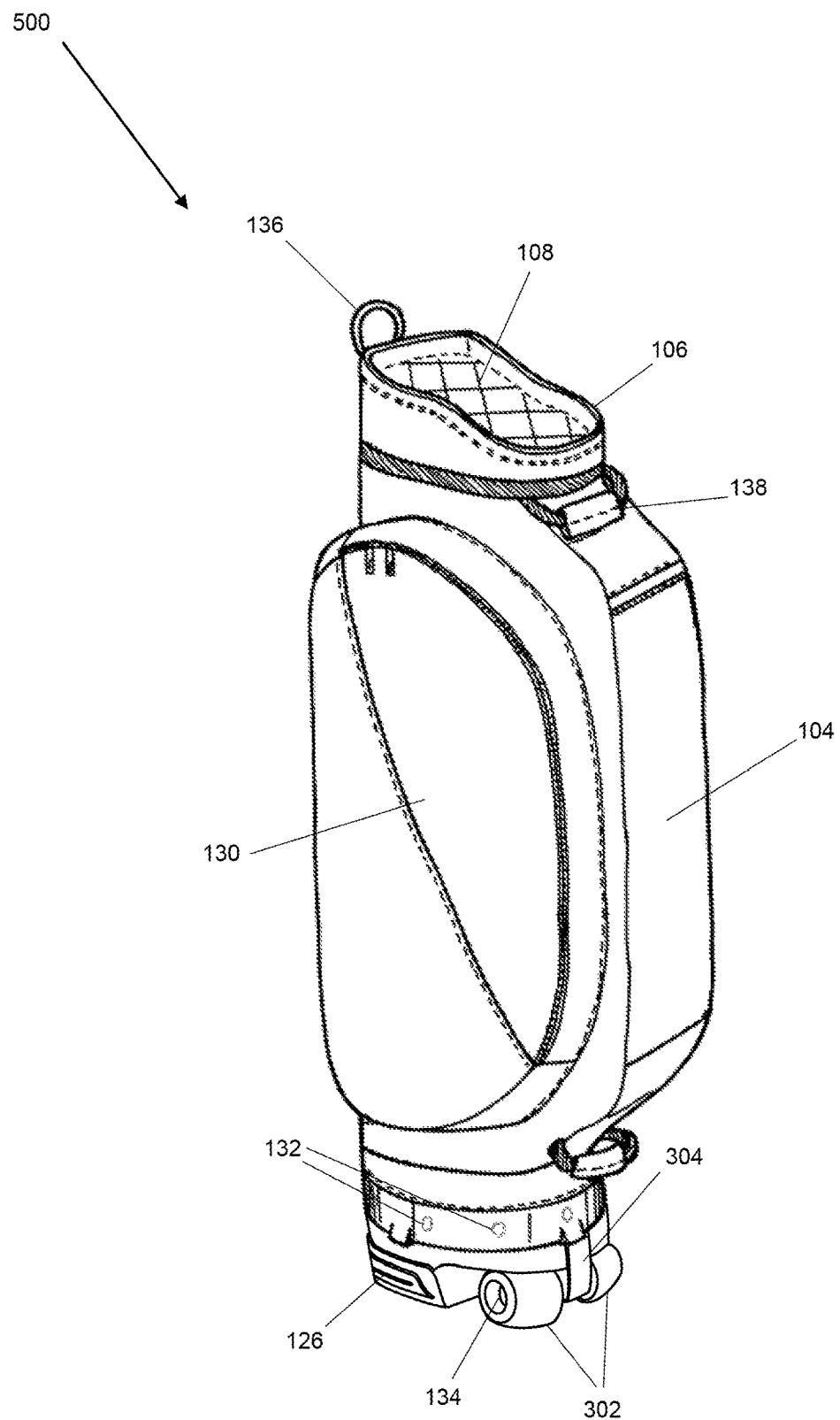
FIG. 12 illustrates a perspective illustration of a third golf bag embodying the present invention viewed from the side.

FIG. 11 illustrates a roller which is split into two independently rotatable parts 422, 424. The roller as a whole still has radiussed end portions 426 and effectively has a reduced diameter centre portion due to radiussed inner ends 428 of the two roller parts. However since these parts can rotate at different rates when the bag is wheeled through a corner, or even turned on the spot, damage to supporting turf is again reduced. In a further embodiment illustrated in FIG. 12, the retro-fit attachment illustrated in FIGS. 7a and 7b forms part of the integral base of a golf bag 500. Like numerals designate like parts illustrated in FIGS. 1a to 11 as the context requires.

As can be seen, a golf bag 500 is provided with two rotatable rollers integrally formed within the base of the bag. The identical rollers 302 are mounted on either end of an axle 134 suspended from a support 304 which extends downwardly from a lower front portion of bag. The rollers 302 are shaped in such a way that when mounted on axle 134, they form an interrupted barrel shape in a similar manner to that described with reference to FIGS. 7a and 7b so as to reduce damage to the supporting turf.

The present description is for illustrative purposes only and should not be construed to narrow the breadth of the present disclosure in any way. Thus, those skilled in the art will appreciate that various modifications might be made to the presently disclosed embodiments without departing from the full and fair scope of the present disclosure. For example, the rotatable roller may be replaced with one or more wheels, such as two convex wheels spaced apart on a common rotational axis. In another example, the retro-fit accessory illustrated in FIGS. 7a and 7b may form the integral base of a golf bag. Moreover, although described as being non releasably coupled to a stiffening structure of a receptacle portion of the golf bag, it is preferred that the mounting allows the roller to be detached. Other aspects, features and advantages will be apparent upon an examination of the attached drawings and appended claims.

The invention claimed is:

1. A golf bag comprising a non-inflatable rotatable roller upon which the bag can be supported while being moved, the roller being axially elongate and having outer portions whose axial section has a convex curvature to reduce damage to ground over which the bag is moved, wherein the rotatable roller is mounted between a pair of support members of a mounting, and wherein the mounting of the rotatable roller is constructed of one or more resiliently flexible materials.

2. A golf bag as claimed in claim 1, wherein the support members are formed as integral parts of a skirt portion depending downwardly from a circumferential edge portion of a base member.

3. A golf bag as claimed in claim 2, wherein the edge portion is substantially "n" shaped.

4. A golf bag as claimed in claim 2, wherein the base member is detachable.

5. A golf bag as claimed in claim 1, wherein the mounting of the rotatable roller is coupled to a stiffening structure of a receptacle portion of the golf bag.

6. A golf bag as claimed in claim 1, wherein the rotatable roller is detachable.

7. A golf bag as claimed in claim 1, wherein the rotatable roller is barrel-shaped.

8. A golf bag as claimed in claim 1, wherein the diameter of the rotatable roller is reduced in a central portion.

9. A golf bag as claimed in claim 1, wherein the rotatable roller comprises a plurality of roller parts independently rotatable about a common axis.

10. A golf bag accessory comprising:
a mount for receipt of a portion of a golf bag;
a securing mechanism for securing the golf bag in the mount; and
a non-inflatable rotatable roller which is axially elongate and comprises an outer surface whose axial section has a convex curvature, wherein the rotatable roller is mounted between a pair of support members of a mounting, and wherein the mounting of the rotatable roller is constructed of one or more resiliently flexible materials.

11. A golf bag accessory as claimed in claim 10, wherein the support members are formed as integral parts of a skirt portion depending downwardly from a circumferential edge portion of a base member.

12. A golf bag accessory as claimed in claim 11, wherein the edge portion is substantially "n" shaped.

13. A golf bag accessory as claimed in claim 10, wherein the mounting of the rotatable roller is coupled to a stiffening structure of a receptacle portion of the golf bag.

14. A golf bag accessory as claimed in claim 10, wherein the rotatable roller is detachable.

15. A golf bag accessory as claimed in claim 10, wherein the rotatable roller is barrel-shaped.

* * * * *